(12) United States Patent
Cohavi et al.

(10) Patent No.: US 12,153,890 B2
(45) Date of Patent: Nov. 26, 2024

(54) GENERATING ANOMALY-DETECTION RULES FOR COMMUNICATION PROTOCOLS

(71) Applicant: imVision Software Technologies Ltd., Ramat Gan (IL)

(72) Inventors: Keren Cohavi, Tel-Aviv (IL); Liora Braunstin, Tel Aviv (IL); Kiril Lashchiver, Kiryat Ono (IL); Yoav Spector, Ramat Gan (IL)

(73) Assignee: Intuit Inc., Mountain View, CA (US)

( * ) Notice: Subject to any disclaimer, the term of this patent is extended or adjusted under 35 U.S.C. 154(b) by 286 days.

(21) Appl. No.: 16/690,439

(22) Filed: Nov. 21, 2019

(65) Prior Publication Data

US 2020/0159998 A1 May 21, 2020

Related U.S. Application Data

(60) Provisional application No. 62/770,225, filed on Nov. 21, 2018.

(51) Int. Cl.
| | |
|---|---|
| *G06F 40/279* | (2020.01) |
| *G06F 21/56* | (2013.01) |
| *G06F 40/289* | (2020.01) |
| *G06F 40/30* | (2020.01) |
| *H04L 9/40* | (2022.01) |
| *H04L 41/0681* | (2022.01) |

(52) U.S. Cl.
CPC ............ *G06F 40/30* (2020.01); *G06F 40/289* (2020.01); *H04L 63/20* (2013.01); *H04L 41/0681* (2013.01)

(58) Field of Classification Search
CPC .... G06F 40/279; G06F 40/284; G06F 40/289; G06F 21/55; G06F 21/56; H04L 63/14; H04L 63/1425; H04L 63/306; G06N 20/00

USPC ................ 704/1, 9, 10; 726/22, 23
See application file for complete search history.

(56) References Cited

U.S. PATENT DOCUMENTS

| | | | | |
|---|---|---|---|---|
| 7,424,619 | B1 * | 9/2008 | Fan ...................... | G06F 21/552 |
| | | | | 713/188 |
| 8,528,091 | B2 * | 9/2013 | Bowen .................. | G06F 21/566 |
| | | | | 713/168 |
| 9,485,225 | B2 * | 11/2016 | Gureghian .............. | H04L 63/20 |
| 9,558,179 | B1 * | 1/2017 | Jurca ..................... | G06F 40/253 |
| 9,680,832 | B1 * | 6/2017 | Tyagi ..................... | H04L 63/10 |
| 9,690,936 | B1 * | 6/2017 | Malik .................... | G06F 21/566 |
| 9,825,976 | B1 * | 11/2017 | Gomez ................ | H04L 63/1416 |
| 9,843,596 | B1 * | 12/2017 | Averbuch ............. | G06F 21/554 |
| 10,038,706 | B2 * | 7/2018 | Mekky ................ | H04L 63/1433 |
| 10,754,948 | B2 * | 8/2020 | Li .......................... | G06N 20/00 |
| 11,003,773 | B1 * | 5/2021 | Fang ..................... | G06N 20/00 |

(Continued)

OTHER PUBLICATIONS

What is Statistical Language Modeling (SLM), url: https://homepages.inf.ed.ac.uk/lzhang10/slm.html, Nov. 15, 2019.

*Primary Examiner* — Martin Lerner
(74) *Attorney, Agent, or Firm* — Lathrop GPM LLP

(57) ABSTRACT

A method and system for generating anomaly-detection rules for communication protocols are provided. The method includes receiving communication data; constructing at least one N-gram from the received communication data; analyzing the at least one N-gram by comparing the constructed at least one N-gram with a repository of N-gram analyses to identify conditional probabilities of certain characteristics; and generating anomaly-detection rules based on the N-gram analysis.

13 Claims, 8 Drawing Sheets

(56) References Cited

U.S. PATENT DOCUMENTS

| | | | |
|---|---|---|---|
| 11,568,133 B2* | 1/2023 | Braunstein | G06F 40/284 |
| 11,568,277 B2* | 1/2023 | Braunstein | G06F 40/205 |
| 2006/0277031 A1* | 12/2006 | Ramsey | G06F 40/279 |
| | | | 704/9 |
| 2007/0174469 A1* | 7/2007 | Andress | H04L 63/08 |
| | | | 709/227 |
| 2009/0254501 A1* | 10/2009 | Song | G06F 40/232 |
| | | | 706/12 |
| 2010/0153316 A1* | 6/2010 | Duffield | G06F 21/552 |
| | | | 706/47 |
| 2011/0167493 A1* | 7/2011 | Song | H04L 63/1466 |
| | | | 726/23 |
| 2016/0134659 A1* | 5/2016 | Reddy | H04L 63/0428 |
| | | | 726/1 |
| 2017/0200323 A1* | 7/2017 | Allouche | G07C 5/0808 |
| 2017/0329314 A1* | 11/2017 | Shang | H04L 63/1425 |
| 2017/0364576 A1* | 12/2017 | Chesla | G06F 21/604 |
| 2018/0089424 A1* | 3/2018 | Yang | G06F 21/552 |
| 2018/0124080 A1* | 5/2018 | Christodorescu | G06F 21/552 |
| 2018/0189677 A1* | 7/2018 | Anderson | G06N 20/00 |
| 2019/0080089 A1* | 3/2019 | Chen | G06F 21/566 |
| 2019/0386883 A1* | 12/2019 | Bhat | H04L 43/14 |
| 2020/0125727 A1* | 4/2020 | Wu | G06F 21/562 |
| 2020/0162496 A1* | 5/2020 | Medalion | G06F 40/30 |

* cited by examiner

GENERATING ANOMALY-DETECTION RULES FOR COMMUNICATION PROTOCOLS

CROSS-REFERENCE TO RELATED APPLICATIONS

This application claims the benefit of U.S. Provisional Application No. 62/770,225 filed on Nov. 21, 2018, the contents of which are hereby incorporated by reference.

TECHNICAL FIELD

The present disclosure relates to techniques for detecting anomalies in mission critical environments, and more particularly, to techniques for detecting anomalies in communication networks, utilizing statistical language modeling.

BACKGROUND

Machine-to-machine communication is widespread over many systems, environments, and disciplines. Financial and banking systems, applying transactions and services, industrial (SCADA) environments, where different machines communicate with each other, communication networks, telecommunication networks, and other systems, each implement machine-to-machine communication via unique configurations and for unique purposes.

Machine-to-machine communication may also be implemented using Application Programming Interfaces (APIs). APIs allow for the development of software compatible with existing systems by standardizing the resources, functions, and other development elements available to programmers. By distributing an API, a software developer can expand the potential uses of an application to include integration with other applications. An example of an API application is a software interface provided by a weather forecasting organization which allows web developers to include a weather module, maintained by the weather forecasting organization, in a website.

Many environments including, without limitation, financial systems, are mission critical environments. Ensuring correct continuing operation of such systems is as much a part of employing such systems as is the initial implementation. In such environments, anomalies may be classified into two major categories: operational and intentional. Operational anomalies occur due to malfunctions or failures in certain elements of a system, bugs, and so on.

Intentional anomalies are usually caused by cyberattacks. As anomalies may imply substantial impact in mission-critical environments, detecting anomalies, preferably in real-time, is crucial to the success of continued operations.

Two major measures are used to indicate the quality of an anomaly detection system, the false alarm rate and the miss detection rate. The false alarm rate is the number of times an anomaly detection mechanism indicates an anomaly, where the tested system performs well, divided by the total number of anomaly indications. The miss detection rate is the ratio between the number of times anomalies were missed by the detection mechanism and the total numbers of anomalies that occurred. For applications where an optimized anomaly detection system is desirable, minimizing both the rate of false alarms and the rate of missed anomalies may lead to an optimal system.

Solutions to anomaly-detection problems in mission-critical environments employing network language processing (NeLP) may be found in the related art. The application of NeLP methods to anomaly detection first requires consideration of an exchange between machines as a "conversation," conducted in a "language" known to the machines. In such a case, specifically, the communication protocol over which the machines communicate, or the channel and protocols standardized by an API, is the "language". To further the goal of solving anomaly-detection problems using NeLP, tools from the natural language processing (NLP) discipline can be applicable to detect anomalies in mission critical environments and to increase the system's detection rate and to reduce its false alarm rate.

Further advancing the language-based approach to anomaly detection by protocol analysis, statistical language (SLM) is a technique used to estimate the distribution of letters, words, or phrases in natural language as accurately as possible. The SLM approach aims to estimate the likelihood that sequences of words appear in the language (i.e. estimate the probability distributions over all possible sentences in the language). The probability estimation of different words and words sequences can highlight patterns of behavior of the communications in the network, or of communications via channels standardized by an API, in the same manner as the technique might estimate the likelihood of a pattern of words recurring in a novel. Applying patterns detected may lead to generation of rules which may describe the normal behavior of the network.

Anomaly detection techniques may also be applied to improve the security of API implementations. As the percentage of web-enabled applications containing exposed APIs increases, the amount of API surface area vulnerable to attack is expected to increase as well. Current API security techniques include the manual patching of bugs and backdoors. This technique requires significant time and effort, as bugs and backdoors must be identified, fixes must be created, and those fixes must be pushed to an API update. Furthermore, as client software may depend on one particular version of an API, altering the structure or resources of the API may cause discontinuities in client application availability.

It would therefore be advantageous to provide a solution that would overcome the above noted deficiencies.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method and system for generating anomaly-detection rules for communication protocols. The method comprises receiving communication data; constructing at least one N-gram from the received communication data; analyzing the at least one N-gram by comparing the constructed at least one N-gram with a repository of N-gram analyses to identify conditional probabilities of certain characteristics; and generating anomaly-detection rules based on the N-gram analysis.

Certain embodiments disclosed herein include a system for generating anomaly-detection rules for communication protocols. The system comprising: a processing circuitry; and a memory, the memory containing instructions that, when executed by the processing circuitry, configure the system to: to receive communication data; construct at least one N-gram from the received communication data; analyze the at least one N-gram by comparing the constructed at least one N-gram with a repository of N-gram analyses to identify conditional probabilities of certain characteristics; and generate anomaly-detection rules based on the N-gram analysis.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION OF THE DRAWINGS

Figure 1:
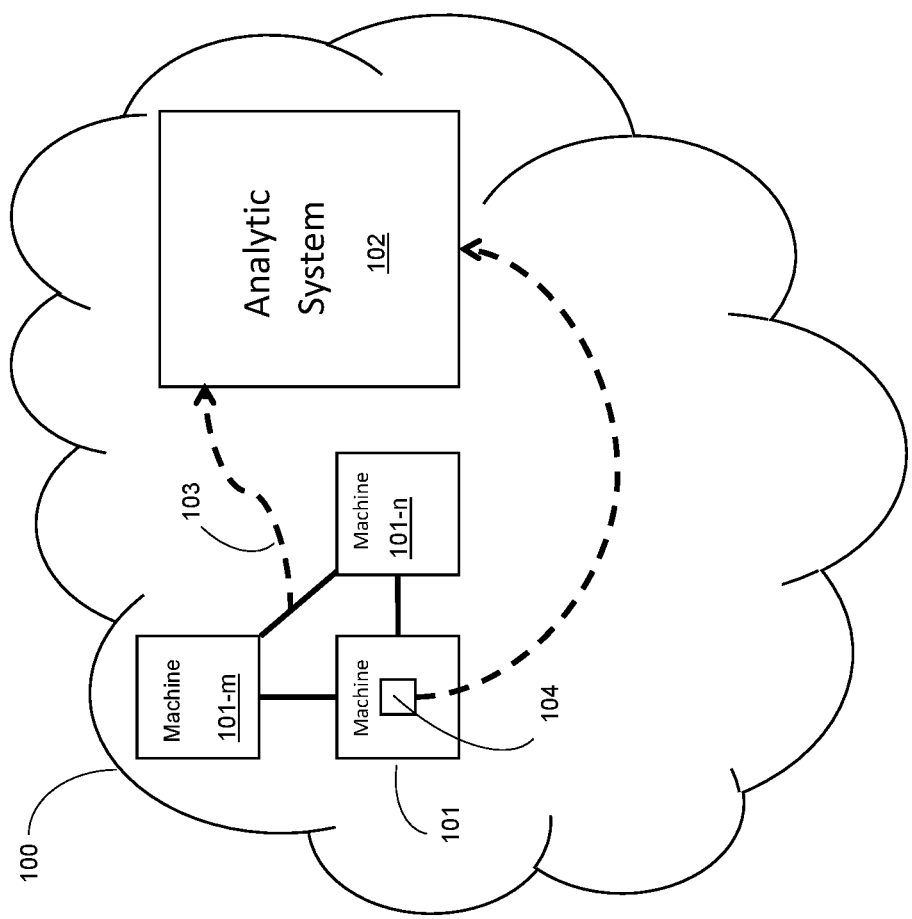
FIG. 1 is an example network diagram utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example diagram illustrating a mission-critical network 100 and utilized to describe the various embodiments. In an embodiment, the mission critical-network 100 may be configured to include at least two machines 101, communicating with one another via a protocol including, without limitation, industrial machine communication protocols, mobile device communication protocols, wired communication protocols, and the like. Further, the mission-critical network 100 may be configured such that the at least two machines 101 communicate with one another via applications based on an API using the communication channels and methods standardized by the API. The network 100 may include, for example, a financial and banking network, an industrial (e.g., SCADA) network, a telecommunication network, and the like.

The network 100 may be further configured to include an analytic system 102 configured to receive information regarding the API, APIs, or communication protocol or protocols employed by the machines 101 and to extract information related to data exchanged between the machines 101. A machine 101 may be any server in the network 100. The application of SLM anomaly-detection techniques in such a system including API transactions may enable the detection and mitigation of API-specific cyberattacks. As an example, an attacker may exploit an API by manipulating the API to bypass a credentials verification step, allowing the attacker to access sensitive information using valid credentials, but without verifying his or her identity.

In an embodiment, the analytic system 102 may be configured to receive and analyze communications between two or more machines 101 by "tapping" or intercepting 103 a communication connection between the machines 101.

The "tap" may be a stalling intercept process, wherein the communication between the machines 101 is paused for the duration of analysis. The "tap" may also be a duplicative process, wherein the communication between the machines 101 is duplicated and the duplicate communication is analyzed, allowing the original communication to proceed from node to node during analysis. The "tapping" or interception of a communication connection between the machine 101 provides for the real-time analysis of individual communicative elements, allowing the analytic system 102 to receive data, analyze content and context, and develop new rules on a persistent basis.

In an embodiment, the analytic system 102 may be configured to receive and analyze communications by receiving a block of aggregated data packets from a plug-in 104 installed in each machine 101. In an embodiment, the plug-in 104 may be configured to log communication data to and from the machine 101 in which the plug-in 104 is installed. Such data includes contents of logged communication packets and context information, such as the order of communication, the delay between communications, and the like. The plug-in 101 may be realized in software, firmware, hardware, or combination thereof.

In an embodiment, each plug-in 104 may be configured to transmit logged communication information to the analytic system 102 at various intervals based on factors. Such factors may include, without limitation, time-intervals, communication counts, communication content or context triggers, and the like. The batching of communication information provides for a standardized procedure for collecting, transmitting, and receiving communication data for analysis, allowing the analytic system 102 to better manage analytic resources and to schedule analytic tasks. Further, the batching of communication information provides for large datasets, which may allow the generation of refined rules based on the extraction of patterns supported by volumes of data.

In an embodiment, the analytic system 102 may be configured to generate anomaly-detection events based on patterns extracted from the received content and context data. In an embodiment, the analytic system 102 may be configured to employ statistical language modeling (SLM) techniques to detect patterns in the received content and context data. The techniques employed to generate anomaly-detection rules may include the generation, isolated analysis of, and clustered analysis of unigrams, bigrams, and higher-order N-grams, constructed from content data, context data, or a combination of the two.

In an example, the analytic system 102 may receive data regarding communications between two machines 101. The second node immediately dispatches a G-type packet upon receiving a F-type packet from the first node. In the example, a bigram analysis of the two packets, where "F-type" and "G-type" are the "phrases" within the bigram, may lead to the generation of a rule specifying that the dispatch of a packet type other than "G-type" after receipt of an "F-type" packet is anomalous.

Figure 2:
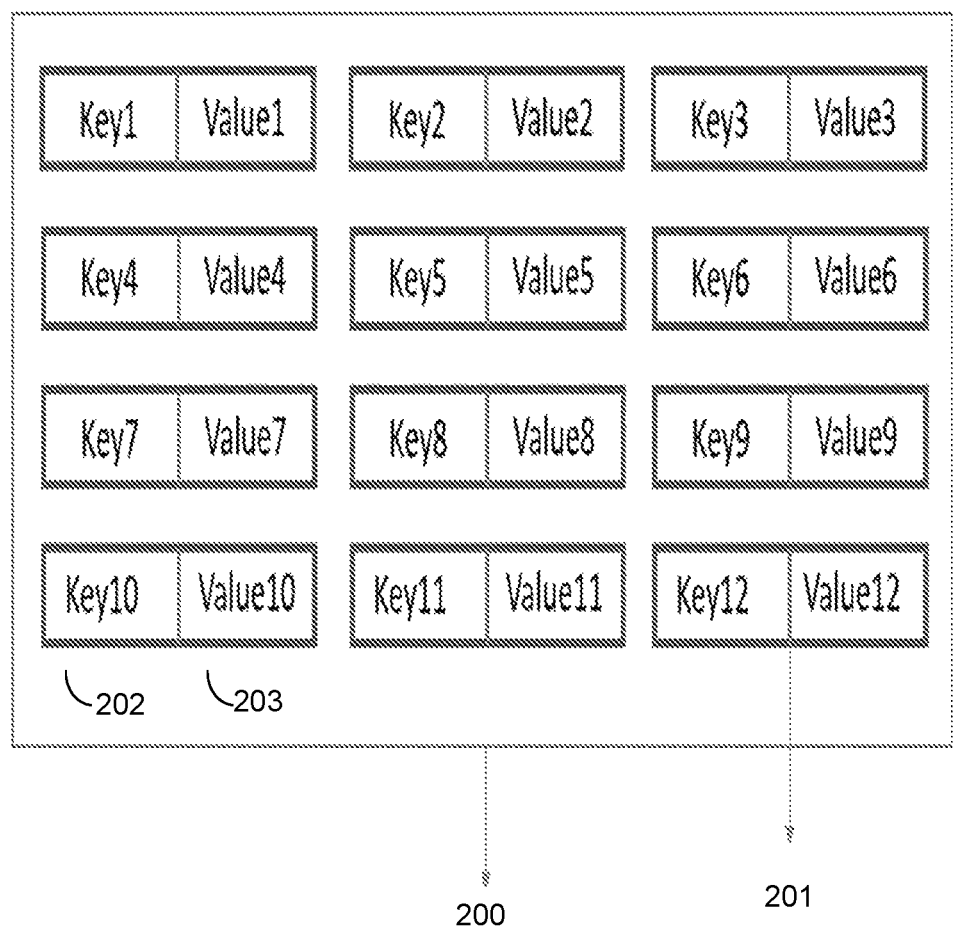
FIG. 2 illustrates a generic scheme of a packet.

FIG. 2 shows a generic scheme of a packet 200. As indicated by the arrows, the entire block is the packet 200, which consists of a sequence of information elements 201. In an example embodiment, the sample packet contains twelve information elements 201. In the exemplary embodiment, each information element includes a tuple, the tuple including a "key" 202 and a "value," 203 where the key 202 is the information element's name, and the value 203 is the content of the information element 201 in the specific packet 200.

In an example embodiment, the "key" may be "message code" and the "value" may be "32." In an example embodiment, specific message codes may indicate a packet's purpose. In an example embodiment, 32 in the GTP protocol may stand for "create session request message." As described, the components illustrated in the drawing may be viewed as language building blocks. In an embodiment, the packet in the drawing may be the "sentence," while the sequence of information elements may be a sequence of "words." In an embodiment, each information element may be used as an entity. In an embodiment, only the keys may be used as an entity.

Figure 3:
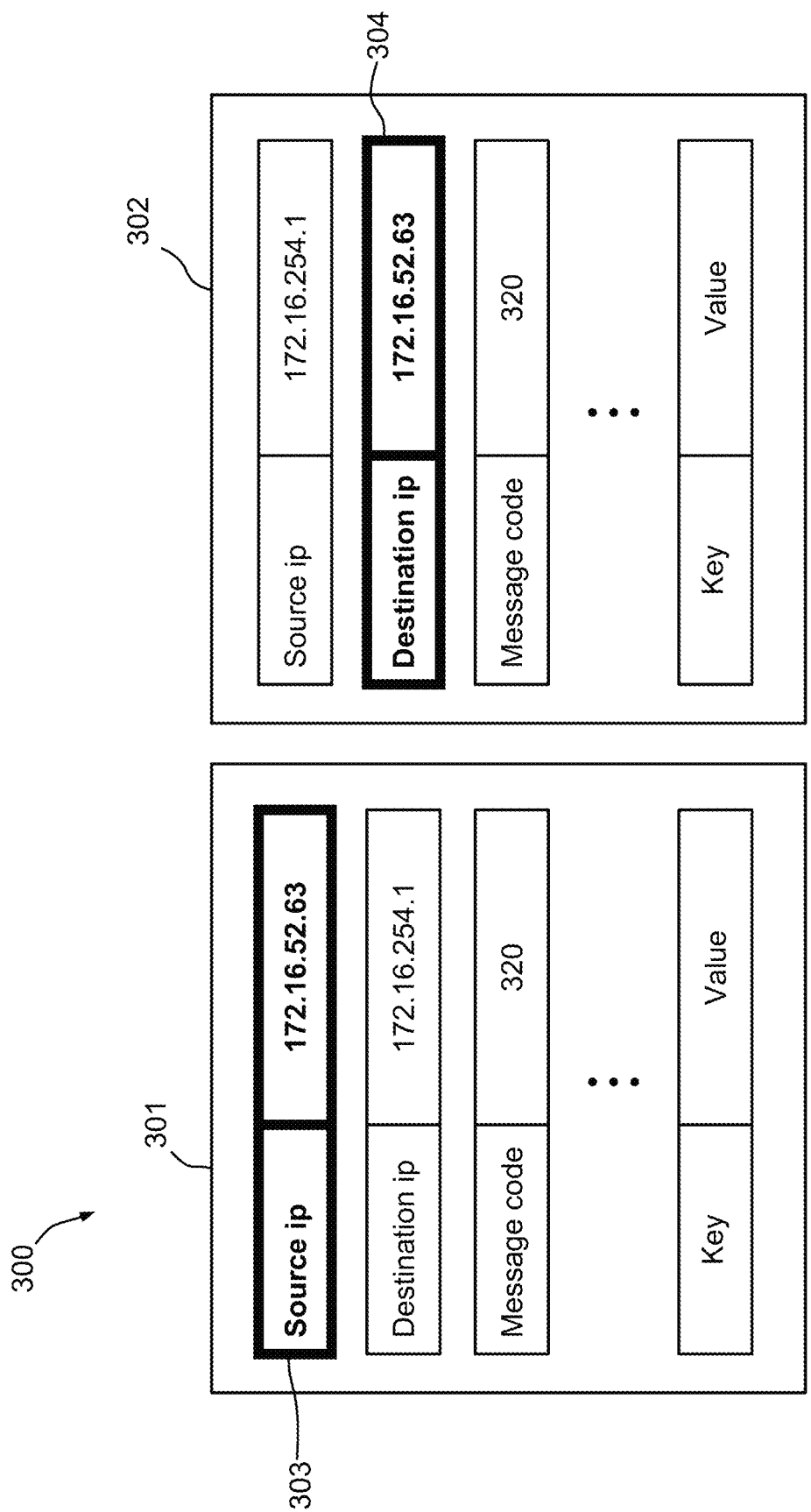
FIG. 3 illustrates the creation of words in the NeLP description of packets that are transmitted in communication networks.

FIG. 3 shows an illustration of two packets 300 including a request packet 301 and a response packet 302. In an example embodiment, some information elements are explicitly described. The arrows point at two information elements, one from each packet, demonstrating a possible choice of representation that serves as an input for the bigram model construction. In the example embodiment, an example of choosing to model the distribution of pairs of words may be found, where the first word 303 is taken from a request packet 301, and the second word 304 is taken from an answer packet 302.

In the example embodiment, a data sample includes the pair (word 1, word 2). In the example embodiment, based on the information elements, the bigram model constructed based on a large data set of packets similar to those shown may yield the rule: "given that the request packet has an information element with a key called "source IP" and the value "172.16.52.63," it is with a probability of 1 that the answer packet will have an information element with a key called "destination IP" and the same value "172.16.52.63"." In the example embodiment, where such results present for any value X (that is, the above conditional probability applies for any IP address), it may be shown that the rule can be improved to have a generic formulation, that the source IP of the request packet always equals the destination IP of its corresponding answer packet.

Figure 4:
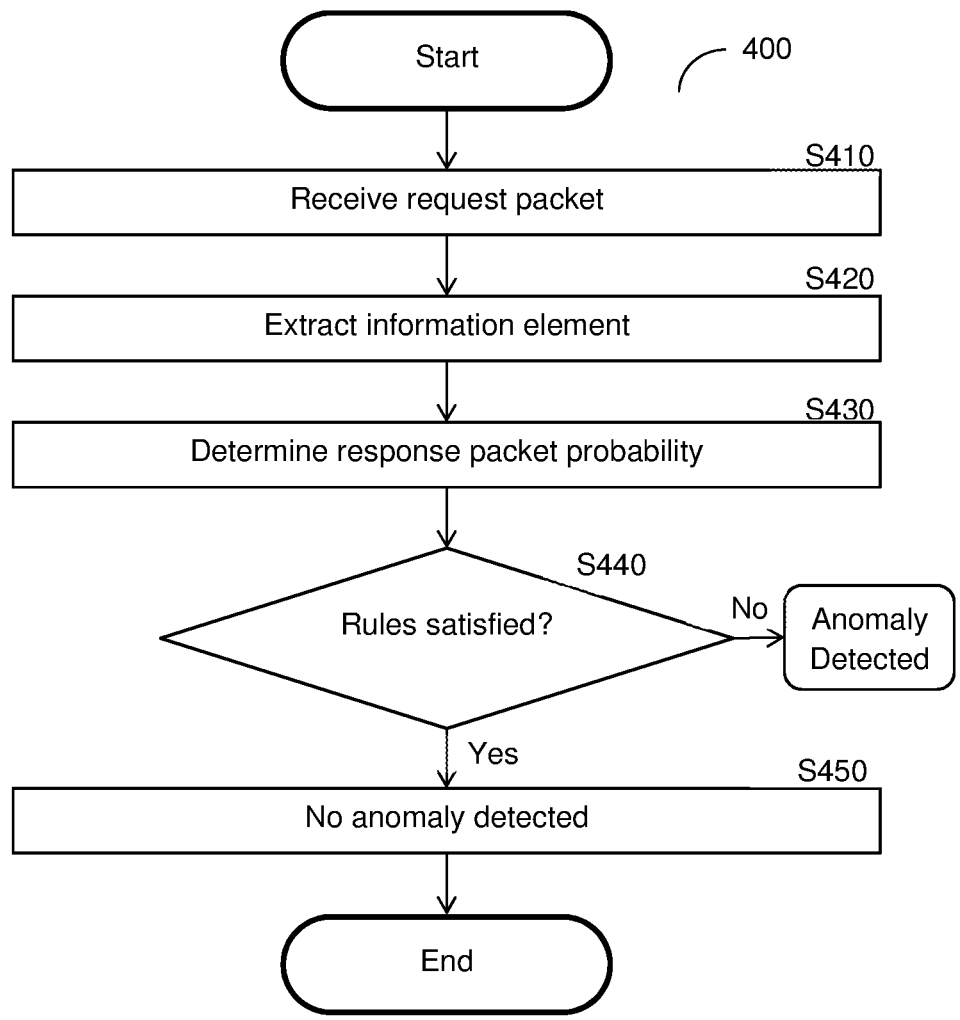
FIG. 4 is a flowchart illustrating the detection of anomalous communications using a bigram analysis.

FIG. 4 is an example flowchart depicting an example implementation 400 according to a bigram model. In an embodiment, the example configuration may detect anomalous behavior based on information exchanged in a request/response protocol by applying a bigram model. Specifically, in an embodiment, the example configuration may assess the contents of request packets, and the response packets generated on receipt of the request packets, to determine the presence of anomalies.

At S410, a request packet is received, the packet containing at least one information element. The information element may be a data structure contained within a formatted data unit such as, without limitation, a packet, frame, segment, datagram or the like. The information element may be the payload of such a formatted data unit, distinguished from the formatted data unit's header and footer information contents, and may contain the transmitted of user or message data. In an example, the request packet received may be an LTE packet and the contained at least one information element may indicate a message type.

At S420, the at least one information element is extracted from the request packet. In an example, the packet may be part of a diameter protocol, an implementation of an API integrating MME and HSS applications, and the information element may indicate a message type. In an embodiment, the extracted information element may be stored in a memory or storage of the system 102.

At S430, the probabilities of the response packet's contents is determined based on the contents of the request packet received at S410 and the information element extracted at S420. For example, where the request packet is received at S410 and where the information element extracted at S420 indicates a message type, analysis of potential response packet contents may indicate a high likelihood that the response packet contains at least one information element indicating the same message type as specified in the information element extracted at S420.

In an embodiment, the probability of response packet information element contents may be based on bigram analysis of previous packets. In a bigram analysis, a bigram consisting of two "elements" or "phrases" is constructed, using the extracted information element from the request packet as a first "element" or "phrase." By analyzing a "dictionary" of response-request transactions, a most-likely "appropriate response" may be determined by assessing the probabilities of possible bigrams wherein the first "element" or "phrase" is the information element extracted from the request packet. As an example, an "appropriate response" to a neighbor saying "hello" may be determined by analyzing a "dictionary" of conversations among neighbors, selecting all phrase-response pairs which begin with a "hello," and selecting the response which is most commonly paired with a "hello." In the same manner, the embodiment may be configured to select an "appropriate response" to a received request packet.

In an additional embodiment, the prediction of response packet information element contents may be based on predetermined rules. Where the prediction of response packet information element contents may be based on predetermined rules, the "appropriate response" to a request packet may be known by reference to a protocol-specific set of rules. Further, as the response set by the predetermined rules is established, the probability that such a response is appropriate is 100%.

For example, in a diameter network, a rule may specify that the "appropriate response" to a request packet containing an information element specifying a certain message type is a response packet containing an information element specifying the same message type.

At S440, it is determined whether the bigram consisting of the request packet's extracted information element and the response packet's information element satisfies the rule based on the prediction made at S430. In an embodiment, the rule applied may specify one or more allowable responses including, but not limited to, a specific response, a range of responses, or a type of response, as required for a specific request packet. Further, in an embodiment, the rule applied may be derived from the bigram analysis at S430 and may include one or more responses which occur with a minimum frequency or probability.

In an additional embodiment, the rule applied may be protocol-driven and may specify one or more specific responses as required, without regard to the "dictionary"-based bigram analysis at S430. For example, where a network employs a diameter protocol, and where the protocol specifies that a response of "n4" is required where a request packet containing the information element "n4" is received, only those response packets which contain the information element "n4" are permissible under the rule.

In an embodiment, if a request-response bigram fails to satisfy the rule at S440, an anomaly may be detected. Where an anomaly is detected, several steps may be available including, but not limited to, notification, archival, or remediation. In an embodiment, where an anomaly is detected, a user or administrator may be notified of the detected anomaly. In a further embodiment, where an anomaly is detected, features including, but not limited to, the detected anomaly, the anomalous bigram, and the request and response packets, may be archived for future inspection. In an additional embodiment, where an anomaly is detected, remedial measures may be implemented, including, but not limited to, denying further service for the protocol without an administrative override, quarantining request and response packets containing elements of the anomalous bigram, and the like.

At S450, where no anomaly is detected at S440, the response packet is sent according to the protocol. As the bigram includes the information element from the request packet and the corresponding information element from the response packet will have satisfied the probabilistic rule, indicating the absence of an anomaly, little or no remediation may be necessary to continue normal protocol operations.

Figure 5:
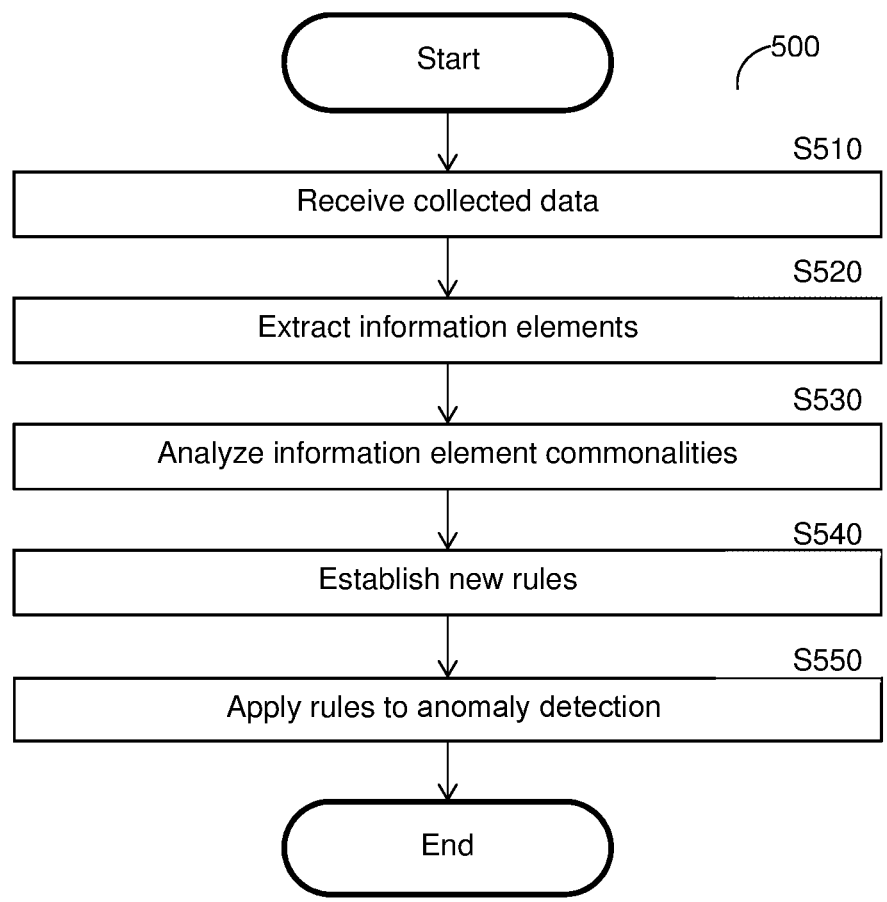
FIG. 5 is a flowchart illustrating a method for generating of anomaly detection rules based on unigram analysis, bigram analysis, and a combination of unigram and bigram analyses according to an embodiment.

FIG. 5 is an example flowchart 500 depicting an example model including bigram and unigram analytic elements. In an embodiment, an example configuration, according to the example model as depicted by the flowchart 500, may detect anomalous behavior by unigram analysis, bigram analysis, and a combination of unigram and bigram analysis. In an embodiment, an example configuration, according to the example model as depicted by the flowchart 500, may assess the contents of request and response packets of one or more communication protocols to identify probabilities and generate rules based on bigram and unigram analyses of the request and response packets.

At S510, collected formatted data units are received, where each collected formatted data unit contains at least one information element. A formatted data unit may be, without limitation, a packet, a frame, a datagram, a segment, a data structure including at least one information element, or the like. The one or more received formatted data units may include, without limitation, request and response packets for a communication protocol, and the like. The one or more collected data elements may be sequential communications within a client-server API interaction or within a communication protocol, such as synchronize-acknowledgment packets in a TCP handshake. The one or more received formatted data units may be, in an example, packets within a diameter protocol and the contained at least one information element may be, without limitation, a key called 3GPP-IMSI, a key called result-code, or a key called experimental-result-code.

At S520, the at least one information element is extracted from each of the received formatted data units. The extracted information element may be stored in a memory or storage of the system 102. In an example embodiment, the received formatted data units may be packets in a diameter protocol, and the at least one extracted information element may be, without limitation, a key called 3GPP-IMSI, a key called result-code, or a key called experimental-result-code.

At S530, the extracted information element is analyzed. This includes analysis of unigrams and bigrams, which allows for analysis of each information element as an individual element and within the context of the API or protocol, if the at least one information element is related to such an API or protocol. Applying unigram analysis, the extracted at least one information element is assessed and compared against a dictionary or other repository of unigram analyses for information elements to determine the overall probability that a given information element received will have a certain characteristic. For example, where the received formatted data units are packets in a diameter protocol, and the extracted information element is a key, such as 3GPP-IMSI, result-code, or experimental-result code, unigram analysis may allow a determination of the likelihood that a given extracted information element will be a 3GPP-IMSI key.

In an embodiment, at least two information elements are received as included in at least two formatted data units and are extracted and analyzed, allowing bigram analysis of the extracted information elements. In the embodiment, a bigram is constructed, using the first of the at least two extracted information elements of the first of the at least two formatted data units as a first "phrase" or "element" and using the second of the at least two extracted information elements of the second of the at least two formatted data units as a second "phrase" or "element." Constructing such bigrams for combinations of formatted data units allows for the generation of conditional probabilities for the appearance of a given information element in a formatted data unit.

For example, the formatted data units received may be packets in a diameter protocol, and the extracted information elements may be keys such as 3GPP-IMSI, result-code, or experimental-result-code. The analysis of bigrams constructed from sets of packets may allow for the recognition of a zero probability that a given key appears in a packet, given that either of the other two keys appear in the same packet, allowing generation of a rule of mutual exclusivity between keys within a packet.

In an embodiment, the analysis of bigrams and unigrams may be combined to assess additional properties and probabilities inherent to the formatted data units assessed. For example, the formatted data units received may be packets in a diameter protocol and the extracted information elements may be keys. Further, the unigram analysis and bigram analysis may indicate, respectively, probabilities of occurrence and mutual exclusivity. The combination of a unigram analysis with a bigram analysis may allow for a determination that the existence of the three keys separates the data communicated into three disjoint subsets. This analysis provides an insight which would not be achieved using only bigram analysis or only unigram analysis.

In an additional embodiment, bigram and unigram analyses may be combined to further analyze the commonalities found between different subsets of data. For example, where the formatted data units are received, where the extracted information elements are keys such as 3GPP-IMSI, result-code, and experimental-result-code, and where the unigram analysis and bigram analysis indicate, respectively, probabilities of occurrence and mutual exclusivity, the combination of a unigram analysis with a bigram analysis may allow a determination that the existence of the three keys separates the data communicated into three disjoint subsets. Further, in the example embodiment, the separation of the data into three disjoint subsets allows for analysis of packet type and contents. In the example, the keys are separated into disjoint subsets, and an analysis may indicate that all request packets contain 3GPP-IMSI keys, and that all other packets are response packets. The analysis may provide that rules may be established specifying that a request packet must contain a 3GPP-IMSI key and that a response packet must contain either a result-code key or an experimental-result-code key, but not both, according to the principle of mutual exclusivity previously identified. In the example embodiment, IMSI is the user's identifier and is provided in every request, while the result code appearing in the response packets describes the result of the transaction; a reason for a failed transaction or a success code.

At S540, new rules governing communication between at least two machines, based on the analysis of the extracted one or more information element, may be implemented. The rules implemented may include, and are not limited to, rules derived from unigram analysis, rules derived from bigram analysis, or rules derived from a combination of unigram and bigram analyses. In an embodiment, the rules implemented may belong to certain categories including, without limitation, permissive (whitelist) rules, restrictive (blacklist) rules, context-dependent rules, prescribed rules specified by a user or administrator, and the like.

In an example embodiment, where the formatted data units received are packets in a diameter protocol, where the extracted information elements are keys such as 3GPP-IMSI, result-code, and experimental-result-code, rules may be implemented requiring, for example, all request packets to have an IMSI key and all response packets to have either a result-code key or an experimental-result-code key, but not both.

At S550, communications are monitored and access to the machines is enforced using the rules generated at S540.

In an embodiment, violation of a rule may cause an anomaly to be detected. In an embodiment, where an anomaly is detected, a mitigation action may be taken. An example for a mitigation action may include generating and sending alerts, blocking access to or from an infected machine, halting an operation of an infected machine, and so on.

Figure 6:
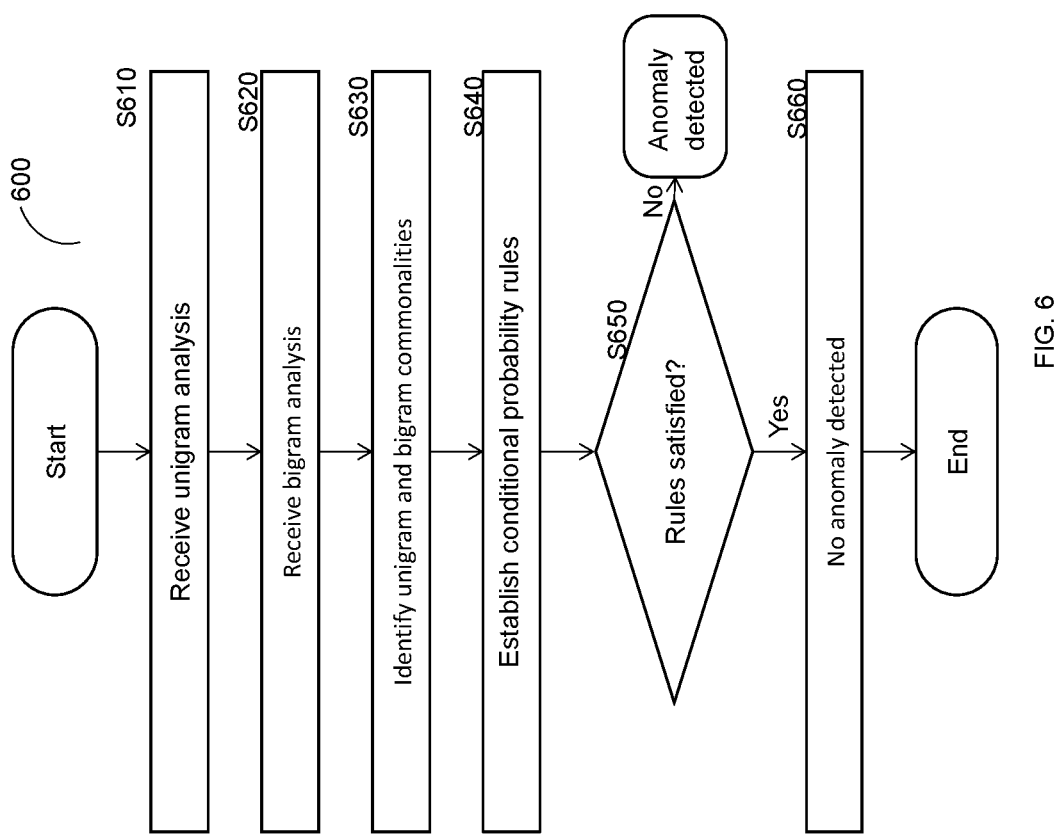
FIG. 6 is flowchart illustrating the generation of rules based on analysis of a combination of unigrams and bigrams, and the application of such rules to managing communications.

FIG. 6 is an example flowchart 600 depicting a method for generating rules based on combined bigram and unigram analysis.

At S610, in an embodiment, at least one unigram analysis is received. The received at least one unigram analysis may include analysis of an information element, where the information element is included in a formatted data unit. The at least one unigram analysis may include, without limitation, analysis of a unigram constructed by including the information element of the formatted data unit as the unigram's "phrase" or "element." In an embodiment, the at least one unigram analysis may include an analysis of a unigram constructed from an information element.

This may include comparing the unigram constructed from an information element with a "dictionary" or other repository of unigrams to determine the probability of a given formatted data unit containing a particular information element. In an example, the at least one unigram analysis concerns a packet, and where the information element is a 3GPP-IMSI key, the received at least one unigram analysis may be a unigram analysis indicating a seventy-five percent chance that a given packet will contain a 3GPP-IMSI key.

At S620, in an embodiment, at least one bigram analysis is received. The received at least one bigram analysis may, in an embodiment, include analysis of a bigram constructed using at least two information elements, where the at least two information elements are included in at least one formatted data unit.

In an embodiment, the received at least one bigram analysis may be an analysis of a bigram constructed using the first of the at least two information elements, included in the same at least one formatted data unit, as a first "phrase" or "element" and the second of the at least two information elements, included in the same formatted data unit, as a second "phrase" or "element."

In an embodiment, the received at least one bigram analysis may be an analysis of a bigram constructed using the first of the at least two information elements, included in the first of at least two formatted data units, as a first "phrase" or "element" and the second of the at least two information elements, included in the second of the at least two formatted data units, as a second "phrase" or "element."

In an embodiment, the received at least one bigram analysis may include an analysis of a bigram constructed from information elements from the same formatted data unit, wherein the analysis of the bigram includes a conditional probability that one particular information element will exist concurrently in a formatted data unit with a specific different information element. The received at least one bigram analysis may include an analysis of a bigram constructed from information elements from separate formatted data units.

The analysis of the bigram includes a conditional probability that a formatted data unit containing a particular information element will precede or succeed a formatted data unit containing another particular information element. In an example embodiment, where the at least one bigram analysis regards a packet in an and where the information element is a 3GPP-IMSI key, the received at least one bigram analysis may be a bigram analysis indicating that a received request packet contains a 3GPP-IMSI key with a one hundred percent probability.

In an embodiment, S610 and S620 may occur concurrently or in any sequence. The disposition included in the illustrative embodiment is merely for demonstrative purposes, and the order of S610 and S620 may be switched or made concurrent without departure from the teachings disclosed herein.

At S630, commonalities within the received at least one unigram analysis and the received at least one bigram analysis may be identified. In an embodiment, the identification of commonalities may include comparison of unigram analyses and bigram analyses for unigrams and bigrams constructed using the same information element. In an example, where the received at least one unigram analysis indicates that a key "a1" appears in a high percentage of formatted data units, and where the received at least one bigram analysis indicates that a conditional probability of zero exists for the possibility of a key "a1" occurring in the same formatted data unit as the key "z9," which represents an error message, the received analyses may be interpreted in context of one another to generate rules regarding formatted data units containing the key "a1."

At S640, conditional probability rules are established, based on the commonalities identified at S630 between the at least one bigram analysis received at S620 and the at least one unigram analysis received at S610. In an embodiment, conditional probability rules including, but not limited to, rules which specify that two information elements cannot occur within the same formatted data unit, rules that specify that a formatted data unit containing a certain information element must precede a formatted data unit containing a separate, distinct information element, rules specifying that a formatted data unit's inclusion of a specific information element denotes a particular purpose to the formatted data unit, and the like, may be established to govern communication patterns.

In an embodiment, the identification of commonalities may include comparison of unigram analyses and bigram analyses for unigrams and bigrams constructed using the same information element. Where the received at least one unigram analysis indicates that a key "a1" appears in a high percentage of formatted data units, and where the received at least one bigram analysis indicates that a conditional probability of zero exists for the possibility of a key "a1" occurring in the same formatted data unit as the a key "z9," which represents an error message, the commonalities between the analyses may be used to establish a rule that the key "a1" must appear in every packet which is not an error packet.

At S650, the rules established at S640 are applied to govern incoming and outgoing formatted data units and to detect and remediate anomalous formatted data unit behavior. In an embodiment, the rule applied may specify one or more allowable responses including, but not limited to, a specific response, a range of responses, or a type of response, as required for a specific formatted data unit or information element. Further, the rule applied may be derived from the received at least one unigram analysis and the received at least one bigram analysis at S640 and may include one or more responses which occur with a minimum frequency or probability.

In an embodiment, if the content of one or more formatted data units fails to satisfy the rule established at S640, an anomaly may be detected. Where an anomaly is detected, several steps may be available including, but not limited to, notification, archival, and remediation. When an anomaly is detected, a user or administrator may be notified of the detected anomaly. When an anomaly is detected, features including, but not limited to, the detected anomaly, the anomalous bigram and unigram, and the request and response packets, may be archived for future inspection. When an anomaly is detected, remedial measures may be implemented, including, but not limited to, denying further service for the protocol without an administrative override, quarantining formatted data units containing anomalous information elements, and the like.

At S660, where no anomaly is detected at S650, formatted data units are communicated without interruption. As the information elements will have satisfied the probabilistic rule, indicating the absence of an anomaly, little or no remediation may be necessary to continue normal protocol operations.

Figure 7:
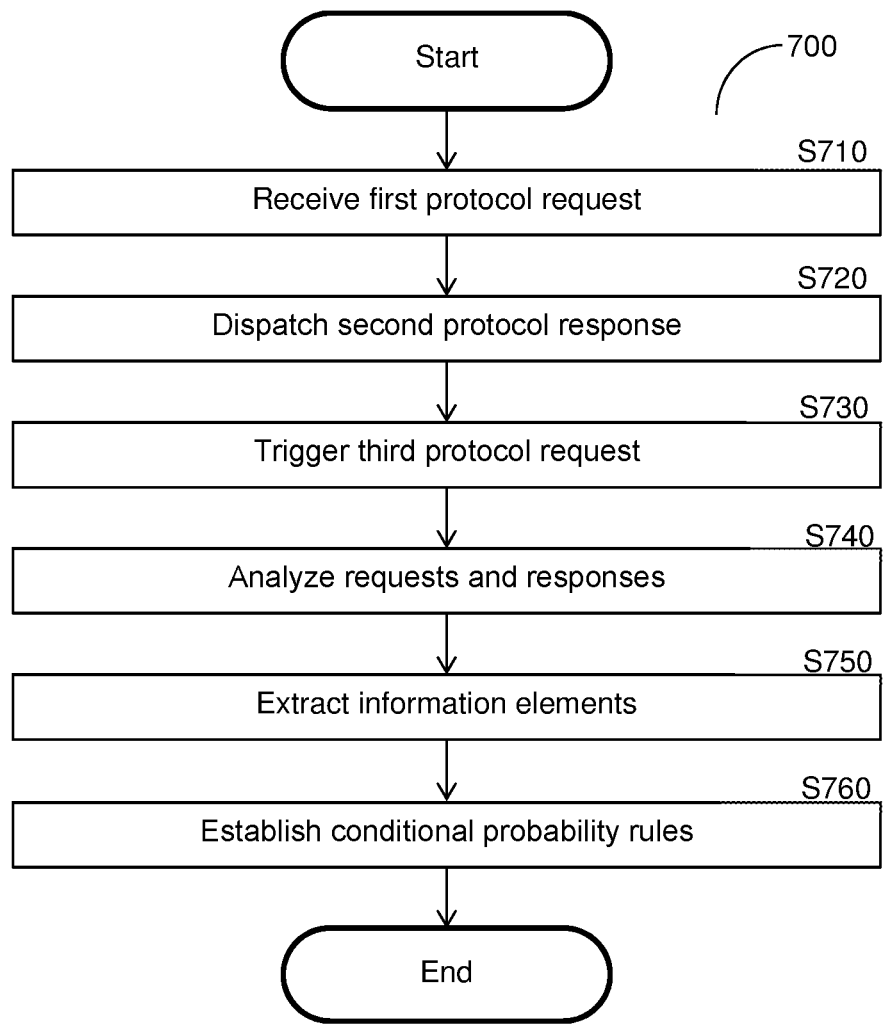
FIG. 7 is a flowchart depicting an example embodiment according to a model for generating anomaly detection rules based on higher-order n-grams.

FIG. 7 is an example flowchart depicting a method for generating anomaly detection rules based on higher-order N-grams according to an embodiment. Here, anomalies may be detected by the application of rules generated using higher-order N-gram analyses. In an embodiment, the contents of formatted data units may be assessed to generate rules based on higher-order N-gram analysis.

At S710, a first protocol request is received. The received request may be part of an API-driven client-server exchange, or it may be a packet belonging to a first protocol, and it may include a packet within a protocol procedure, and at least one information element. For example, the received first protocol request may be an LTE update location request, a part of an attach-procedure operation. In an example, the receipt of the first protocol request may trigger a second response.

At S720, a second protocol response is dispatched. The dispatched second protocol response may be an API-driven client-server communication or may be a packet belonging to a second protocol. The dispatched second protocol response may be a packet belonging to the first protocol. In an embodiment, the dispatched second protocol response may be a packet within a protocol procedure. The dispatched second protocol response may contain at least one information element. In an example, the dispatched second protocol request is an LTE update location response, a part of an attach-procedure operation. In an example, the receipt of the first protocol request at S710 may trigger the dispatch of the second protocol response. In an example, the second protocol response triggers a third request.

At S730, a third protocol request is triggered. The triggered third protocol request may be an API-driven client-server communication or may be a packet belonging to a third protocol. The triggered third protocol request may be a packet belonging to a protocol other than the third protocol including, without limitation, the first protocol or the second protocol. The triggered third protocol request may be a packet within a protocol procedure. In an embodiment, the triggered third protocol request may contain at least one information element. In an example, the triggered third protocol response is an LTE create session request, a part of an attach-procedure operation. In an example, the dispatch of the second protocol response at S720 may trigger the third protocol request.

At S740, the received requests and responses are analyzed. Analysis of the requests and responses may indicate, without limitation, the types of requests and responses, the various protocols to which each request or response belongs, specific protocol-procedures, and like information. The analysis of requests and responses may include, and is not limited to, detection of request/response sequences, observation of request/response data headers, and like techniques.

At S750, the information elements contained in the requests and/or responses may be extracted. In an embodiment, each request and response analyzed may contain at least one information element. In an embodiment, the extraction of the at least one information element from each request and each response may include, without limitation, isolating individual information elements, recognizing information element structures, observing information element headers and bodies, and like techniques. In an embodiment, the extracted information elements may be stored.

At S760, conditional probability rules are established based on N-gram analyses of request and response information and extracted information element information. In an embodiment, conditional probability rules may be established based on analyses of N-grams constructed from extracted information elements, analyzed requests and responses, or a combination of both. In an embodiment, the analysis of N-grams constructed from extracted information elements, analyzed requests and responses, or a combination of both, may allow the identification of patterns, within the analyzed data, which may be useful as request-response operation rules. In an embodiment, constructed N-grams may be stored. In an embodiment, constructed N-grams may be compared with archived N-grams to develop comparative rules. In an embodiment, N-grams may be compared to develop rules based on commonalities.

In an example, for an LTE attach-procedure, where the received first request is an update location request, where the dispatched second response is an update location response, and where the triggered third request is a create session request, a 4-gram model may be developed. In the example, the received first request may have a key name IMSI with a value of "x," the triggered third request may have a key name IMSI with a value of "x" and a key name MSISDN with a value of "y," a rule may be established, with a one-hundred-percent certainty, that the dispatched second response will include a key name MSISDN with a value of "y." In the example, a rule may be further established, specifying that the key name APN must have the same values in the dispatched second response and in the triggered third request. In the example, deviations from the rules established may indicate an anomaly.

Figure 8:
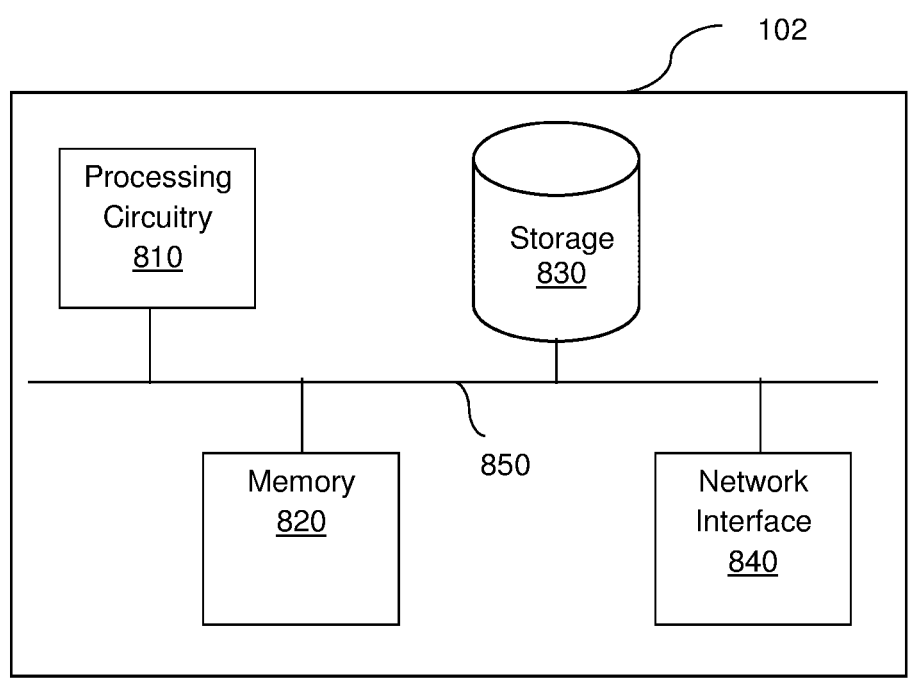
FIG. 8 is a block diagram of a system configured to execute the disclosed embodiments.

FIG. 8 is an example schematic diagram of the analytic system 102 according to an embodiment. The system 102 includes a processing circuitry 810 coupled to a memory 820, a storage 830, and a network interface 840. In an embodiment, the components of the system 800 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., RAM, etc.), non-volatile (e.g., ROM, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein. Specifically, the processes and methods described with references to FIGS. 4-7.

The storage 830 may be magnetic storage, optical storage, and the like, and may be realized, for example, as flash memory or other memory technology, CD-ROM, Digital Versatile Disks (DVDs), or any other medium which can be used to store the desired information.

The network interface 840 allows the system 800 to communicate with the agent 840 for the purpose of, for example, receiving data, sending data, and the like. Further, the network interface 840 allows the system 800 to communicate with the machines 101 for the purpose of generating anomaly-detection rules for communication protocols and API implementations.

It should be understood that the embodiments described herein are not limited to the specific architecture illustrated in FIG. 8, and other architectures may be equally used without departing from the scope of the disclosed embodiments.

It may be noted that the implementations, embodiments, and the like described above may be applicable to APIs, API communications, and other aspects of API implementation without departing from the scope of the disclosed. In an embodiment, the methods, techniques, and the like may be applied to detection of anomalous business logic behaviors in an API-driven exchange, rather than the detection of anomalous communications within a communication protocol. In such an embodiment, the detection of anomalous business logic behaviors may be applicable to any API protocol including domain-specific protocols such as diameter protocols, and web API protocols, such as REST/JSON.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
receiving a request packet, comprising a formatted data unit, that is being communicated between two machines using a communication protocol, wherein the formatted data unit contains at least one information element within the communication protocol and used as part of the communication protocol, and wherein the at least one information element includes a tuple;
extracting the at least one information element from the formatted data unit;
constructing a first bigram comprising a first element and a second element by selecting the at least one information element as the first element of the first bigram, and determining the second element of the first bigram by performing a bigram analysis, comprising:
selecting at least one bigram from a dictionary comprising a plurality of bigrams, the plurality of bigrams each having the first element constructed from a previous request packet and the second element constructed from a corresponding previous response packet corresponding to a request-response transaction of the communication protocol, wherein the first element of the at least one bigram of the plurality of bigrams includes the first element of the first bigram, to obtain a set of selected bigrams,
selecting the second element of the first bigram as a most commonly paired second element with the first element of the first bigram within the set of selected bigrams, and
calculating a probability of the second element of the first bigram from the set of selected bigrams;
establishing, based on the probability and the first element of the first bigram, a rule for the communication protocol, the rule governing communication between the two machines; and
applying the rule for anomaly detection during monitored communication between the two machines using the communication protocol.

2. The method of claim 1, wherein:
receiving the request packet includes intercepting and processing a communication destined for an application on at least one of the two machines.

3. The method of claim 1, wherein:
receiving the request packet includes intercepting and duplicating an original communication of a data stream between the two machines to form a duplicate communication, processing the duplicate communication, and returning the original communication to the data stream.

4. The method of claim 1, wherein receiving the request packet includes receiving a communication data log, containing records of at least one communication, from a plug-in.

5. The method of claim 1, further comprising:
constructing an n-gram from the request packet, wherein the request packet includes information elements, content data and context data.

6. The method of claim 5, wherein the n-gram comprises at least one of unigrams, bigrams, or higher-order n-grams.

7. A non-transitory computer readable medium having stored thereon instructions for causing a processing circuitry to execute a process comprising:
receiving a request packet, comprising a formatted data unit, that is being communicated between two machines using a communication protocol, wherein the formatted data unit contains at least one information element within the communication protocol and used as part of the communication protocol, and wherein the at least one information element includes a tuple;
extracting the at least one information element from the formatted data unit;
constructing a first bigram comprising a first element and a second element by selecting the at least one information element as the first element of the first bigram, and determining the second element of the first bigram by performing a bigram analysis, comprising:
selecting at least one bigram from a dictionary comprising a plurality of bigrams, the plurality of bigrams each having the first element constructed from a previous request packet and the second element constructed from a corresponding previous response packet corresponding to a request-response transaction of the communication protocol, wherein the first element of the at least one bigram of the plurality of bigrams includes the first element of the first bigram, to obtain a set of selected bigrams,
selecting the second element of the first bigram as a most commonly paired second element with the first element of the first bigram within the set of selected bigrams, and
calculating a probability of the second element of the first bigram from the set of selected bigrams;
establishing, based on the probability and the first element of the first bigram, a rule for the communication protocol, the rule governing communication between the two machines; and
applying the rule for anomaly detection during monitored communication between the two machines using the communication protocol.

8. A system comprising:
a processing circuitry; and
a memory, the memory containing instructions that, when executed by the processing circuitry, configure the system to:
receive a request packet, comprising a formatted data unit, that is being communicated between two machines using a communication protocol, wherein the formatted data unit contains at least one information element within the communication protocol and used as part of the communication protocol, and wherein the at least one information element includes a tuple;
extract the at least one information element from the formatted data unit;
construct a first bigram comprising a first element and a second element, by selecting the at least one information element as the first element of the first bigram, and determining the second element of the first bigram by performing a bigram analysis, comprising:
selecting at least one bigram from a dictionary comprising a plurality of bigrams, the plurality of bigrams each having the first element constructed from a previous request packet and the second element constructed from a corresponding previous response packet corresponding to a request-response transaction of the communication protocol, wherein the first element of the at least one bigram of the plurality of bigrams includes the first element of the first bigram, to obtain a set of selected bigrams,
selecting the second element of the first bigram as a most commonly paired second element with the first element of the first bigram within the set of selected bigrams, and
calculating a probability of the second element of the first bigram from the set of selected bigrams;
establish, based on the probability and the first element of the first bigram, a rule for the communication protocol, the rule governing communication between the two machines; and
apply the rule for anomaly detection during monitored communication between the two machines using the communication protocol.

9. The system of claim 8, wherein the system is further configured to intercept and process a communication destined for an application on at least one of the two machines.

10. The system of claim 8, wherein the system is further configured to intercept and duplicate an original communication of a data stream between the two machines to form a duplicate communication, process the duplicate communication, and return the original communication to the data stream.

11. The system of claim 8, wherein the system is further configured to receive a communication data log, containing records of at least one communication, from a plug-in.

12. The system of claim 8, wherein the system is further configured to: construct an n-gram from the request packet, wherein the request packet includes information elements, content data and context data.

13. The system of claim 12, wherein the n-gram comprises at least one of unigrams, bigrams, or higher-order n-grams.

* * * * *